(12) United States Patent
Bremser et al.

(10) Patent No.: US 6,506,836 B1
(45) Date of Patent: Jan. 14, 2003

(54) METHOD FOR PRODUCING A POLYMER REACTION PRODUCT

(75) Inventors: Wolfgang Bremser, Muenster (DE); Frank Strickmann, Steinfurt (DE); Maximilian Bendix, Oelde (DE); Wolfgang Paulus, Ober-Olm (DE); Roman Benedikt Raether, Limburgerhof (DE); David Christie, Mannheim (DE)

(73) Assignees: BASF Aktiengesellschaft, Ludwigshafen (DE); BASF Coating AG, Muenster (DE)

( * ) Notice: Subject to any disclaimer, the term of this patent is extended or adjusted under 35 U.S.C. 154(b) by 0 days.

(21) Appl. No.: 09/868,095

(22) PCT Filed: Dec. 18, 1999

(86) PCT No.: PCT/EP99/10015

§ 371 (c)(1),
(2), (4) Date: Jul. 30, 2001

(87) PCT Pub. No.: WO00/37507

PCT Pub. Date: Jun. 29, 2000

(30) Foreign Application Priority Data

Dec. 18, 1998 (DE) .......................... 198 58 708
Mar. 5, 1999 (DE) .......................... 199 09 803

(51) Int. Cl.$^7$ .................. C08F 18/00; C08F 293/08
(52) U.S. Cl. .................. 525/64; 525/273; 525/391; 526/204; 526/292.5
(58) Field of Search .................. 595/64, 391, 273; 526/204, 292.5

(56) References Cited

U.S. PATENT DOCUMENTS 4,085,168 A * 4/1978 Milkovich et al. .......... 260/886
5,385,996 A 1/1995 Rizzardo et al. .......... 526/240

FOREIGN PATENT DOCUMENTS

| EP | 0 218 436 | 4/1987 |
| EP | 0 597 747 | 5/1994 |
| EP | 0 732 359 | 9/1996 |
| WO | WO 91/06535 | 5/1991 |
| WO | WO 92/13903 | 8/1992 |
| WO | WO 93/22351 | 11/1993 |
| WO | WO 93/22355 | 11/1993 |
| WO | WO 95/12568 | 5/1995 |
| WO | WO 96/15157 | 5/1996 |
| WO | WO 97/13792 | 4/1997 |
| WO | WO 98/01478 | 1/1998 |
| WO | WO 98/37104 | 8/1998 |

OTHER PUBLICATIONS

Cacioli et al. "Copolymerization of ω–Unsaturated Oligo-(Methyl Methacrylate): New Macromonomers" J. Macromol. Sci. Chem. vol. A23 (1986) pp. 839–852.

* cited by examiner

Primary Examiner—James J. Seidleck
Assistant Examiner—Olga Asinovsky
(74) Attorney, Agent, or Firm—Keil & Weinkauf

(57) ABSTRACT

A process for preparing a reaction product (A), comprising the following stage (i):

(i) reacting under free-radical conditions a reaction mixture comprising at least one free-radically reactable monomer (a) in the presence of at least one free-radical initiator and of a compound (I) of the formula:

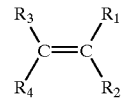

in which $R_1$ to $R_4$ each independently of one another are hydrogen, a substituted or unsubstituted alkyl radical, cycloalkyl radical or arakyl radical, or an unsubstituted or a substituted aromatic hydrocarbon radical, with the proviso that at least two of $R_1$ to $R_4$ are an unsubstituted or a substituted aromatic hydrocarbon radical in aqueous phase.

19 Claims, No Drawings

METHOD FOR PRODUCING A POLYMER REACTION PRODUCT

The present invention relates to a process for preparing a reaction product (A) by reacting under free-radical conditions at least one free-radically reactable monomer (a) in the presence of at least one free-radical initiator and of a compound (I) as defined below in aqueous phase, to said reaction production per se, to a process for preparing a polymer using said reaction product, and to the use thereof in polymer dispersions.

The present invention is situated within the technical field of free-radical addition polymerization, having features typical of a living polymerization system, the process of the invention being able in principle to provide reaction products, or polymers, which can have a narrow molecular weight distribution ($M_w/M_n$). Furthermore, through an appropriate selection of monomers and, if desired, successive addition of various monomers, it is possible to produce both branched and unbranched homopolymers and copolymers, and also block copolymers. In this context the present invention relates not only to the polymer per se but also to a reaction product obtained in a first stage.

For a number of years there has been great interest in processes and process concepts that are suitable for preparing a large number of polymers and make it possible to prepare polymers of this kind having a predetermined structure, molecular weight and molecular weight distribution.

For instance, WO 98/01478 describes a process for preparing polymers in which the monomer to be reacted, which is selected in particular from vinyl monomers and acid derivatives having unsaturated groups, such as anhydrides, esters and imides of (meth)acrylic acid, for example, is reacted in the presence of a free-radical initiator and a thiocarbonylthio compound as chain transfer agent.

WO 92/13903 describes a process for preparing polymers having a low molecular weight by free-radical chain polymerization of one or more monomers in the presence of a group transfer agent, as defined therein, which has a C—S double bond. On the evidence of that document the compounds described therein having a C—S double bond act not only as chain transfer agents but also as growth regulators, so that in accordance with that document it is only possible to prepare polymers of low molecular weight in the presence of this compound.

A process for free-radical chain polymerization of unsaturated monomers in aqueous medium and in the presence of a macromonomer having a —$CH_2$—C(X)=$CH_2$ end group is defined in WO 93/22351, which also defines X. On the evidence of the examples of that application, various (meth)acrylates or (meth)acrylic acid and, if desired, monomers such as styrene are reacted in each case under emulsion or suspension polymerization conditions.

WO 93/22355 relates to a process for preparing crosslinkable polymers using a macromonomer as described in WO 93/22351.

WO 96/15157 likewise describes a process for preparing polymers having a comparatively narrow molecular weight distribution, in which a vinyl monomer, as defined therein, is reacted with a likewise vinyl-terminated macromonomer in the presence of a free-radical initiator.

Furthermore, WO 98/37104 relates to the preparation of polymers of controlled molecular weight, including acrylate-based polymers, by free-radical polymerization of corresponding monomers using a chain transfer agent which is defined more closely therein and has a C—C double bond and radicals which activate that double bond in terms of the free-radical addition reaction of monomers.

A free-radical chain polymerization or copolymerization with an ω-unsaturated oligo(methyl methacrylate) with ethyl acrylate, styrene, methyl methacrylate, acrylonitrile and vinyl acetate as comonomers is described in a scientific article in J. Macromol. Sci.-Chem., A 23(7), 839–852 (1986).

It is an object of the present invention to provide a novel process for preparing a reaction product which can likewise be used, inter alia, as a macroinitiator and which can first itself be used as an emulsifier or disperser and with the aid of which it is also possible to react further free-radically homopolymerizable or copolymerizable monomers in order to obtain further polymers possibly differing in composition. It is a further object of the present invention to provide for specific adjustment of polymer properties and so to allow the diverse use of polymers thus adjusted which are obtainable by simple free-radical polymerization, in particular by preparing block structures by means of free-radical polymerization.

We have found that these objects can be achieved by the process of the invention for preparing a reaction product (A), comprising the following stage (i):

(i) reacting under free-radical conditions a reaction mixture comprising at least one free-radically reactable monomer (a) in the presence of at least one free-radical initiator and of a compound (I) of the formula:

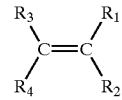

in which $R_1$ to $R_4$ each independently of one another are hydrogen, a substituted or unsubstituted alkyl radical, cycloalkyl radical or aralkyl radical, or an unsubstituted or a substituted aromatic hydrocarbon radical, with the proviso that at least two of $R_1$ to $R_4$ are an unsubstituted or a substituted aromatic hydrocarbon radical in aqueous phase.

The invention further provides a reaction product (A) preparable by means of a process comprising the following stage (i):

(i) reacting under free-radical conditions a reaction mixture comprising at least one free-radically reactable monomer (a) in the presence of at least one free-radical initiator and of a compound (I) of the formula:

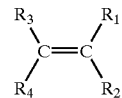

in which $R_1$ to $R_4$ each independently of one another are hydrogen, a substituted or unsubstituted alkyl radical, cycloalkyl radical or aralkyl radical, or an unsubstituted or a substituted aromatic hydrocarbon radical, with the proviso that at least two of $R_1$ to $R_4$ are an unsubstituted or a substituted aromatic hydrocarbon radical in aqueous phase.

Within the scope of the above process of the invention it is possible to use all free-radically reactable monomers as monomer (a). As monomer (a) it is preferred to use those free-radicaly homopolymerizable or copolymerizable compounds which include a hydrophilic group, such as, for example, a carboxyl group. With further preference, the monomers (a) comprise hydrophilic, free-radically homopoly-merizable or copolymerizable monomers, i.e. monomers whose solubility in water is greater than that of styrene. It is of course also possible for mixtures of different hydrophilic monomers, and mixtures of at least one hydrophilic monomer and at least one hydrophobic monomer, to be present in the reaction mixture of stage (i). Specific representatives of monomers (a) are:

methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functionalized methacrylates; acrylic acids and styrenes, selected from glycidyl methacrylate, 2-hydroxyethyl methacrylate, hydroxypropyl methacrylate (all isomers), hydroxybutyl methacrylate (all isomers), diethylaminoethyl methacrylate, triethylene glycol methacrylate, itaconic anhydride, itaconic acid, glycidyl acrylate, 2-hydroxyethyl acrylate, hydroxypropyl acrylate (all isomers), hydroxybutyl acrylate (all isomers), diethylaminoethyl acrylate, triethylene glycol acrylate, methacrylamide, N-tert-butylmethacrylamide, N-n-butylmethacrylamide, N-methylolmethacrylamide, N-ethylolmethacrylamide, N-tert-butylacrylamide, N-butylacrylamide, N-methylol-acrylamide, N-ethylolacrylamide, vinylbenzoic acid (all isomers), diethylaminostyrene (all isomers), alpha-methylvinylbenzoic acid (all isomers), diethylamino-alpha-methylstyrene (all isomers), paramethylstyrene, p-vinylbenzenesulfonic acid, trimethoxysilylpropyl methacrylate, triethoxysilylpropyl methacrylate, tributoxysilyapropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilyl-propyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilyl-propyl acrylate, dibutoxysilylpropyl acrylate, diisopropoxysilylpropyl acrylate, vinyl acetate and vinyl butyrate, vinyl chloride, vinyl fluoride, vinyl bromide, and mixtures of the abovementioned monomers.

Preferably used as a first monomer (a') are acrylic or methacrylic acid, a $C_1$–$C_4$-alkyl or $C_1$–$C_4$-hydroxyalkyl acrylate or methacrylate, vinyl acetate, a substituted or unsubstituted vinyl pyrrolidone, a mixture of two or more thereof, or a mixture of said first monomer (a) with at least one further free-radically homopoly-merizable or copolymerizable monomer (a).

Also used in accordance with the invention in connection with the preparation of the reaction product (A) is a compound (I) of the formula:

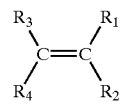

in which $R_1$ to $R_4$ each independently of one another are hydrogen, an unsubstituted or substituted alkyl radical, cycloalkyl radical or aralkyl radical or an unsubstituted or substituted aromatic hydrocarbon radical, the invention requiring at least two of $R_1$ to $R_4$ to be an unsubstituted or substituted aromatic hydrocarbon radical.

Here again it is possible in principle to use all compounds of the above formula in accordance with the invention. Preference is given as compound (I) to the use of diphenylethylene, dinaphthaleneethylene, 4,4-vinylidenebis(N,N'-dimethylaniline), 4,4-vinylidenebis(aminobenzene), cis- and trans-stilbene or a mixture of two or more thereof, further preference being given to using diphenylethylene. It is also possible to use substituted diphenylethylenes, which are substituted on either one or both aromatic hydrocarbon radicals with electron-withdrawing or electron-donating substituents, such as, for example, tert-butyl, benzyl or CN groups, or an alkoxydiphenyl-ethylene, such as, for example, methoxy-, ethoxy- or tert-butoxydiphenylethylene, or analogous thio or amine compounds.

In addition, the process of the invention is conducted in the presence of at least one free-radical initiator, preference being given here to oxidizing free-radical initiators. The initiator should preferably be soluble in water. In general, however, it is possible to use all azo and/or peroxo compounds which are conventionally used in free-radical chain polymerization. Suitable initiators are described in WO 98/01478 on p. 10, lines 17–34, which in this regard is incorporated in its entirety into the present specification. Preference is given to the use of oxidizing free-radical initiators, such as potassium, sodium and ammoniun peroxodisulfates, for example, or to a combination of a conventional—i.e., non-oxidizing—initiator with $H_2O_2$.

In one preferred embodiment of the process of the invention a comparatively large amount of free-radical initiator is added, the free-radical initiator as a proportion of the reaction mixture being preferably from 0.5 to 50% by weight, more preferably from 1 to 20% by weight, based in each case on the overall amount of the monomer (a) and of the initiator. The ratio of initiator to compound (I) is preferably from 3:1 to 1:3, more preferably from 2:1 to 1:2, and in particular from 1.5:1 to 1:1.5.

The reaction described above in accordance with stage (i) is conducted in the aqueous phase, in which case preference is given here to water or mixtures of water with water-miscible solvents, such as THF and ethanol, for example. It is, however, also possible to conduct the reaction in the presence of a mixture of water and a water-immiscible solvent, such as, for example, an aromatic solvent, such as toluene, for example.

In a further embodiment the above reaction according to stage (i) is conducted in the presence of at least one base. In this context, all low molecular mass bases can be used in principle, with preference being given to NaOH, KOH, ammonia, diethanolamine, triethanolamine, mono-, di- and triethylamine, dimethylethanolamine or a mixture of two or more thereof and particular preference to ammonia and di- and triethanolamine.

The conducted at temperatures reaction in accordance with stage (i) is generally above room temperature and below the decomposition temperature of the monomers, the temperature range chosen being preferably from 50 to 150° C., more preferably from 70 to 120° C. and, in particular, from 80 to 110° C.

Although no restrictions whatsoever exist in respect of the molecular weight distribution, it is possible in the reaction according to (i) to obtain a reaction product which has a molecular weight distribution $M_w/M_n$ measured by gel permeation chromatography using polystyrene as standard, of $\leq 4$, preferably $\leq 3$, more preferably $\leq 2$, in particular $\leq 51.5$ and, in certain cases, $\leq 51.3$. The molecular weights of the reaction product (A) can be controlled within wide limits through the choice of the ratio of monomers (a) to compounds (I) to free-radical initiator. In this context the molecular weight is determined in particular by the amount of compound (I), specifically such that the greater the proportion of compound (I), the lower the resulting molecular weight.

The reaction in accordance with stage (i) can also be conducted in the presence of a surface-active substance.

The reaction product obtained in the reaction according to (i), which is generally produced in the form of an aqueous mixture, can in that case be processed further directly as a dispersion or else used as a macroinitiator for the subsequent reaction in accordance with stage (ii), as defined later on below. It is also possible to isolate the reaction product of stage (i) as a solid and then to react it further or send it for use.

In the reaction in accordance with stage (ii) it is possible to react at least one freely selectable, free-radically homopolymerizable or copolymerizable monomer (b). This monomer (b) can be identical to or different than the monomer (a) used in stage (i). The selection of the monomer (b) is made in principle in accordance with the desired structure of the polymer prepared in stage (ii) and hence in dependence on the intended use of this polymer.

The following specific monomers preferred for use as monomers (b) may be mentioned:

monomers (b) are preferably selected from monoethylenically unsaturated $C_3$–$C_{10}$ monocarboxylic acids, their alkali metal salts and/or ammonium salts, examples being acrylic acid, methacrylic acid, dimethylacrylic acid, ethylacrylic acid, allylacetic acid and vinylacetic acid, and also monoethylenically unsaturated $C_4$–$C_8$ dicarboxylic acids, their monoesters, anhydrides, alkali metal salts and/or ammonium salts, examples being maleic acid, fumaric acid, itaconic acid, mesaconic acid, methylenemalonic acid, citraconic acid, maleic anhydride, itaconic anhydride and methylmalonic anhydride; and also monoethylenically unsaturated monomers containing sulfonic acid groups, examples being allylsulfonic acid, styrenesulfonic acid, 2-acrylamido-2-methylpropanesulfonic acid, methallylsulfonic acid, vinylsulfonic acid, 3-sulfo-propyl acrylate and 3-sulfopropyl methacrylate, and also monoethylenically unsaturated monomers containing phosphonic acid groups, examples being vinylphosphonic acid, allylphosphonic acid and acrylamidoethylpropane-phosphonic acid, $C_1$–$C_{20}$-alkyl and hydroxyalkyl esters of monoethylenically unsaturated $C_3$–$C_{10}$ monocarboxylic acids or $C_4$–$C_8$ dicarboxylic acids, examples being methyl acrylate, ethyl acrylate, n-butyl acrylate, stearyl acrylate, diethyl maleate, hydroxyethyl acrylate, hydroxypropyl acrylate, hydroxybutyl acrylate, hydroxy-ethyl methacrylate and hydroxypropyl methacrylate, and also (meth)acrylic esters of alkoxylated $C_1$–$C18$ alcohols that have been reacted with from 2 to 50 mol of ethylene oxide, propylene oxide, butylene oxide or mixtures thereof; and also amides and N-substituted amides of monoethylenically unsaturated $C_3$–$C_{10}$ mono-carboxylic acids or $C_4$–$C_8$ dicarboxylic acids, examples being acrylamide, N-alkyl acrylamides and N,N-dialkyl-acrylamides having in each case 1 to 18 carbon atoms in the alkyl group, such as N-methylacrylamide, N,N-dimethylacrylamide, N-tert-butylacrylamide and N-octadecylacrylamide, N-methylhexylmaleamide, N-decamaleamide, diethylaminopropylmethacrylamide and acryl-amidoglycolic acid; and also alkylamidoalkyl (meth)-acrylates, examples being dimethylaminoethyl acrylate, dimethylaminoethyl methacrylate, ethylaminoethyl acrylate, diethylaminoethyl methacrylate, dimethylaminopropyl acrylate and dimethylaminopropyl methacrylate; and also vinyl esters, such as vinyl formate, vinyl acetate and vinyl propionate, which may also be in hydrolyzed form following the polymerization; and also N-vinyl compounds, examples being N-vinylpyrrolidone, N-vinylcaprolactam, N-vinylformamide, N-vinyl-methylformamide, 1-vinylimidazole and 1-vinyl-2-methylimidazole; and also vinyl ethers of $C_1$–$C_{18}$ alcohols, vinyl ethers of alkoxylated $C_1$–$C_{18}$ alcohols and vinyl ethers of polyalkylene oxides such as polyethylene oxide, polypropylene oxide or polybutylene oxide, styrene or its derivatives such as alphamethylstyrene, indene and dicyclopentadiene;

monomers containing amino or imino groups, such as, for example, dimethylaminoethyl acrylate, diethylaminoethyl methacrylate, diethylaminopropylmethacrylamide and allylamine, monomers which carry quaternary ammonium groups, in the form, for example, of salts, as obtained by reacting the basic amino functions with acids such as hydrochloric acid, sulfuric acid, nitric acid, formic acid or acetic acid, or in quaternized form (examples of suitable quaternizing agents being dimethyl sulfate, diethyl sulfate, methyl chloride, ethyl chloride and benzyl chloride), such as, for example, dimethylaminoethyl acrylate hydrochloride, diallyldimethylammonium chloride, dimethylaminoethyl acrylate methyl chloride, dimethylaminoethylaminopropylmethacrylamide propylmethacrylamide methosulfate, vinylpyridinium salts and 1-vinylimidazolium salts; and monomers in which the amino groups and/or ammonium groups are liberated only after the polymerization and subsequent hydrolysis, such as, for example, N-vinylformamide and N-vinylacetamide.

The present invention accordingly also provides a process for preparing a polymer (B) comprising:

reacting the reaction product (A) obtained in stage (i) under free-radical conditions in the presence of at least one free-radically homopolymerizable or copolymerizable monomer (b).

The reaction in accordance with stage (ii) is conducted in principle in accordance with the customary conditions for a free-radical polymerization, it being possible for appropriate solvents to be present.

Stages (i) and (ii) of the process of the invention can be conducted separately from one another both spatially and temporally, in which case, of course, stage (i) is conducted first and then stage (ii). In addition, however, stages (i) and (ii) can also be carried out in succession in one reactor; i.e., first of all the compound of the formula (I) is reacted partially or totally, as a function of the desired use and/or of the desired properties, with at least one monomer (a) and then at least one monomer (b) is added and free-radical polymerization is carried out, or else right from the beginning a monomer mixture comprising at least one monomer (a) and at least one monomer (b) is used and is reacted with the compound (I). In this context it is assumed that the compound (I) is first of all reacted with said at least one monomer (a) and then the reaction product (A) formed therefrom also reacts, above a certain molecular weight, with the monomer (b).

Depending on reaction regime it is possible in accordance with the invention in this case to prepare end group-functionalized polymers, block or multiblock and gradient (co)polymers, star polymers, graft copolymers and branched (co)polymers.

As is evident from the above, the present invention also provides the polymer (B) per se preparable by the process defined above. In this context the reaction of the invention is preferably conducted so as to give a polymer (B) having a block structure. In this context it is possible, in accordance with the invention, for the first time to provide block copolymers in a simple manner using a readily available compound (I), these block copolymers having, for example, a hydrophilic block such as, for example, a (meth)acrylic acid or a $C_{1-4}$ alkyl (meth)acrylate block, and a further, preferably hydrophobic, polymer block, such as, for example, a block based on vinylaromatic monomers, such as, for example, styrene or substituted styrenes, and also nonaromatic vinyl compounds, such as, for example, vinyl acetate, and also higher ($>C_4$) alkyl (meth)acrylates.

Furthermore, it is also possible in accordance with the invention to prepare polymers of the following structure:

poly((meth)acrylic acid-stat-(meth)acrylate-b-(styrene-stat-(meth)acrylate)), the term "(meth)acrylate" denoting alkyl esters of methiacrylic acid and acrylic acid.

Specifically, mention may be made of the following, new block copolymers:

poly(acrylic acid-b-styrene), poly(methylmethacrylate-b-styrene), poly(methacrylic acid-b-hydroxyethyl acrylate), poly(methyl methacrylate-b-N-vinyl-pyrrolidone), poly(methyl methacrylate-b-N-vinyl-formamide), poly(methyl methacrylate-b-hydroxyethyl acrylate), poly(methyl methacrylate-b-(styrene-stat-acrylonitrile)), poly(n-butyl acrylate-b-styrene-b-n-butyl acrylate), poly(methyl methacrylate-b-styrene-b-methyl methacrylate-b-styrene), and poly(n-butyl acrylate-b-styrene-b-n-butyl acrylate-b-styrene).

Furthermore, the present invention also provides an aqueous mixture comprising the reaction product (A) of the invention, the polymer (B) of the invention or a combination of two or more thereof.

The aqueous mixture comprising the reaction product (A) can be used in particular as a primary dispersion. The reaction product (A) and/or the polymer (B) or a mixture of two or more thereof can be used in accordance with the field of application in a form suitable for the purpose, especially in polymer dispersions.

The intention of the text below is to illustrate the present invention with reference to a number of examples.

EXAMPLE 1

Synthesis of Poly(acrylic Acid-b-styrene)

224 g of water and 15.4 g of 25% strength ammonia were heated to 90° C. 3 g of 1,1-diphenylethylene dissolved in 45 g of acrylic acid, and 4.73 g of ammonium peroxodisulfate dissolved in 22.4 g of water, were then added dropwise in parallel through 2 dropping funnels over the course of 30 minutes. The batch was held at 90° C. for a total of 4 hours.

101 g of this batch were admixed with 25 g of water, 40 ml of 25% strength ammonia solution and 38 g of styrene and then held at 90° C. for 13 hours.

This gives a white, water-swellable polymer.

EXAMPLE 2

Synthesis of Poly(methyl Methacrylate-b-styrene)

125 g of 25% strength ammonia solution in 125 g of water were introduced initially and the oil bath was held at 90° C. 6 g of 1,1-diphenylethylene dissolved in 125 g of methyl methacrylate, and 4.73 g of ammonium peroxodisulfate dissolved in 22.4 g of water, were then added dropwise in parallel through 2 dropping funnels over the course of 60 minutes. Subsequently a further 4.73 g of ammonium peroxodisulfate dissolved in 22.4 g of water were added dropwise over the course of an hour. The batch was then held at 90° C. for one hour more.

65 g of styrene were added to this batch and the oil bath temperature was raised to 100° C. After 4 hours, a white, water-swellable polymer was obtained with an $M_w$ of 15,000 g/mol and a polydispersity of 1.5. The block structure was detected by means of electron microscopy.

EXAMPLE 3

Synthesis of Poly(methacrylic Acid-b-hydroxyethyl-acrylate)

112 g of water and 112 g of 25% strength ammonia solution were introduced initially and heated to 90° C. Then 9.46 g of ammonium peroxodisulfate dissolved in 45 g of water were added dropwise over the course of 30 minutes and 6 g of 1,1-diphenylethylene dissolved in 107.5 g of methacrylic acid were added dropwise rapidly.

Subsequently, a further 9.46 g of ammonium peroxodisulfate dissolved in 45 g of water were added dropwise over the course of 30 minutes.

Following this addition, the batch was held at 90° C. for 5 hours.

Then 1 mol of hydroxyethyl acrylate was added and the batch was held at 85° C. for 5 hours.

A water-soluble polymer was obtained.

EXAMPLE 4

Synthesis of Poly(methyl Methacrylate-b-N-vinyl-pyrrolidone)

360 g of water were introduced initially and held at 90° C. Then, in parallel, 10 g of 1,1-diphenylethylene dissolved in 200 g of methyl methacrylate, and 10.3 g of ammonium peroxodisulfate dissolved in 100 g of water, were added dropwise over the course of 60 minutes and 9.2 g of 25% strength ammonia solution dissolved in 100 g of water were added dropwise over the course of 90 minutes. The batch was subsequently held at 90° C. for 3 hours.

Thereafter, 20.4 g of N-vinylpyrrolidone were added to 100 g of the above-described dispersion and the batch was held at 75° C. for 6 hours.

EXAMPLE 5

Synthesis of Poly(methyl Methacrylate-b-N-vinyl-formamide)

360 g of water were introduced initially and held at 90° C. Then, in parallel, 10 g of 1,1-diphenylethylene dissolved in 200 g of methyl methacrylate, and 10.3 g of ammonium peroxodisulfate dissolved in 100 g of water, were added dropwise over the course of 60 minutes and 9.2 g of 25% strength ammonia solution dissolved in 100 g of water were added dropwise over the course of 90 minutes. The batch was subsequently held at 90° C. for 3 hours.

Thereafter, 25 g of N-vinyl-formamide were added to 100 g of the above-described dispersion and the batch was held at 75° C. for 6 hours.

EXAMPLE 6

Synthesis of Poly(methyl Methacrylate-b-hydroxyethyl acrylate)

360 g of water were introduced initially and held at 90° C. Then, in parallel, 10 g of 1,1-diphenylethylene dissolved in 200 g of methyl methacrylate, and 10.3 g of ammonium peroxodisulfate dissolved in 100 g of water, were added dropwise over the course of 60 minutes and 9.2 g of 25% strength ammonia solution dissolved in 100 g of water were added dropwise over the course of 90 minutes. The batch was subsequently held at 90° C. for 3 hours.

Thereafter, 25 g of hydroxyethyl acrylate were added to 100 g of the above-described dispersion and the batch was held at 75° C. for 6 hours.

EXAMPLE 7

Synthesis of Poly(methyl Methacrylate-b-(styrene-stat-acrylonitrile))

360 g of water were introduced initially and held at 90° C. Then, in parallel, 10 g of 1,1-diphenylethylene dissolved in 200 g of methyl methacrylate, and 10.3 g of ammonium peroxodisulfate dissolved in 100 g of water, were added dropwise over the course of 60 minutes and 9.2 g of 25% strength ammonia solution dissolved in 100 g of water were added dropwise over the course of 90 minutes. The batch was subsequently held at 90° C. for 3 hours.

Thereafter, 17.2 g of styrene and 1 g of acrylonitrile were added to 100 g of the above-described dispersion and the batch was held at 75° C. for 6 hours.

A polymer was obtained having an $M_w$, of 7,100 g/mol and a polydispersity of 2.7.

EXAMPLE 8

Synthesis of Poly(n-butyl Acrylate-b-styrene-b-n-butyl Acrylate)

360 g of water were initially introduced and the oil bath was heated to 90° C. Then, through 3 dropping funnels, 11.1 g of 1,1-diphenylethylene dissolved in 256 g of n-butyl acrylate and 10.7 g of sodium peroxodisulfate dissolved in 100 g of water, were added dropwise in parallel over the course of 180 minutes and 2.3 g of sodium hydroxide dissolved in 100 g of water were added dropwise over the course of 120 minutes. The oil bath was held at 90° C. for a total of 6 hours.

Following the removal of the aqueous phase, 138 g of styrene were added to the remaining polymer and the oil bath was held at 115° C. for 6 hours.

Subsequently, 169 g of n-butyl acrylate were added and the oil bath was held at 115° C. for 6 hours.

A polymer was obtained having an $M_w$, of 366,000 g/mol and a polydispersity of 2.6.

EXAMPLE 9

Synthesis of Poly(methyl Methacrylate-b-styrene)

180 g of water were introduced initially and held at 90° C. Then, in parallel, from 3 dropping funnels, 3 g of cis-stilbene dissolved in 50 g of methyl methacrylate and 5 g of 25% strength ammonia solution dissolved in 50 g of water were added dropwise over 60 minutes and 5.1 g of ammonium peroxodisulfate dissolved in 50 g of water were added dropwise over 90 minutes.

The batch was then held at 90° C. for a further 4.5 hours. A polymer was obtained having an $M_w$ of 54,200 g/mol and a polydispersity of 2.4.

70 g of the polymer dispersion described above were heated to 115° C. and 50 g of styrene were metered in. The batch was then held at 115° C. for 6 hours.

A polymer was obtained having an $M_w$ of 207,000 g/mol and a polydispersity of 3.1.

EXAMPLE 10

Synthesis of Poly(methyl Methacrylate-b-styrene)

180 g of water were introduced initially and held at 90° C. Then, in parallel, from 3 dropping funnels, 3 g of trans-stilbene dissolved in 50 g of methyl methacrylate and 5 g of 25% strength ammonia solution dissolved in 50 g of water were added dropwise over 60 minutes and 5.1 g of ammonium peroxodisulfate dissolved in 50 g of water were added dropwise over 90 minutes.

The batch was then held at 90° C. for a further 4.5 hours. A polymer was obtained having an $M_w$ of 46800 g/mol and a polydispersity of 2.9.

70 g of the polymer dispersion described above were heated to 115° C. and 50 g of styrene were metered in. The batch was then held at 115° C. for 6 hours.

A polymer was obtained having an $M_w$ of 207,000 g/mol and a polydispersity of 4.2.

EXAMPLE 11

Synthesis of Polymethyl Methacrylate (1st Stage Only)

180 g of water were introduced initially and held at 90° C. Then, in parallel, from 3 dropping funnels 5 g of 4,4-vinylidenebis(N,N-dimethylaniline) dissolved in 100 g of methyl methacrylate and 4.6 g of 25% strength ammonia solution dissolved in 100 g of water were added dropwise over the course of 60 minutes and 5.1 g of ammonium peroxodisulfate dissolved in 100 g of water were added dropwise over the course of 90 minutes.

The batch was then held at 90° C. for a further 4 hours. A polymer was obtained having an $M_w$ of 2150 g/mol and a polydispersity of 1.2.

EXAMPLE 12

A reaction vessel was charged with 52.56 g of deionized water and this initial charge was heated to 90° C. Subsequently, at a constant temperature of 90° C., three separate feedstreams were metered in at a uniform rate in parallel. Feedstream 1 consisted of 10.18 g of acrylic acid, 18.35 g of methyl methacrylate and 1.49 g of diphenylethylene. As feedstream 2, 9.9 g of a 25% strength by weight ammonia solution were added. Feedstream 3 consisted of a solution of 2.25 g of ammonium peroxodisulfate in 5.25 g of deionized water. Feedstreams I and II were metered in over the course of 1 hour, feedstream III over the course of 1.25 hours. When addition was at an end, a 4-hour postpolymerization phase ensued, with cooling. The resulting micellar solution had a solids content of 33% by weight.

EXAMPLE 13

First of all, 9.1 g of the product prepared in Example 12 were initially introduced in 51.62 g of deionized water and this initial charge was heated to 90° C. with stirring in a reactor. Subsequently, a feedstream consisting of 16.19 g of n-butyl methacrylate, 14.21 g of styrene and 8.88 g of ethylhexyl methacrylate was metered in over the course of 6 hours with thorough stirring. The resulting dispersion had a solids content of 42% by weight.

EXAMPLE 14

A 5 kg steel reactor was charged with 906.0 g of deionized water and this initial charge was heated to 90° C. Subsequently, at a constant temperature of 90° C., three separate feedstreams were metered in at a uniform rate in parallel over the course of 4 hours. Feedstream I consisted of 457.6 g of ethyl acrylate, 215.3 g of acrylic acid and 20.2 g of diphenylethylene. Feedstream II was a solution of 40.4 g of ammonium peroxodisulfate in 94.2 g of deionized water. Feedstream III was composed of 133.2 g of dimethylethanolamine and 133.2 g of deionized water. When addition was at an end, a 2-hour postpolymerization phase ensued at 90° C. This gave a slightly orange, clear solution which had a pH of 5.2, a viscosity of 5.2 dpas, a solids content (60 minutes at 130° C.) of 40.3% and an alcoholically determined acid number of 246 mg of KOH/g of solids.

EXAMPLE 15

A 5 kg steel reactor was charged with 800.0 g of the aqueous solution prepared in Example 14 and this initial charge was heated to 90° C. A solution consisting of 83.2 g of ethyl acrylate, 67.2 g of n-butyl acrylate, 80.0 g of styrene and 89.6 g of hydroxypropyl methacrylate was metered in over the course of 30 minutes, after which the batch was subjected to thermolysis at 90° C. for 5 hours. This gave a slightly orange solution which had a pH of 5.3, a viscosity of 8.4 dpas, a solids content (60 minutes at 130° C.) of 39.7% and an alcoholically determined acid number of 133 mg of KOH/g of solids.

EXAMPLE 16

A 5 kg steel reactor was charged with 528.7 g of deionized water and this initial charge was heated to 90° C. Subsequently, at a constant temperature of 90° C., three separate feedstreams were metered in at a uniform rate in parallel over the course of 4 hours. Feedstream I consisted of 106.2 g of MA-13, 378.1 g n-butyl methacrylate, 159.3 g of styrene, 54.5 g of acrylic acid, 332.4 g of methyl methacrylate and 31.9 g of diphenylethylene. Feedstream II was a solution of 42.5 g of ammonium peroxodisulfate in 170 g of deionized water. Feedstream III contained 51.61 g of dimethylethanolamine. When addition was at an end, a 2-hour postpolymerization phase ensued at 90° C. Cooling gave a white dispersion which had a pH of 5.5, a solids content (60 minutes, 130° C.) of 41%, an alcoholically determined acid number of 58 mg of KOH/g of solids and a viscosity of 0.9 dPas (23° C., cone/plate). The molecular weight was determined by means of GPC against polystyrene as standard and was $M_w$ 4406 g/mol, $M_w$ 8603 g/mol, polydispersity 1.95.

MA-13: methacrylic ester 13.0 Röhm

We claim:

1. A process for preparing a reaction product (A), comprising the following stage (i):
    (i) reacting under free-radical conditions a reaction mixture comprising at least one free-radically reactable monomer (a) in the presence of at least one free-radical initiator and of a compound (I) of the formula:

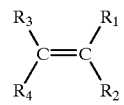

In which $R_1$ to $R_4$ each independently of one another are hydrogen, a substituted or unsubstituted alkyl radical, cycloalkyl radical or aralkyl radical, or an unsubstituted or a substituted aromatic hydrocarbon radical, with the proviso that at least two of $R_1$ to $R_4$ are an unsubstituted or a substituted aromatic hydrocarbon radical in aqueous phase.

2. A process as claimed in claim 1, wherein the reaction is conducted in the presence of at least one base.

3. A process as claimed in claim 1, wherein said compound (I) is diphenylethylene, an alkoxydiphenylethylene dinaphthaleneethylene, 4,4-vinylidenebis(N,N-dimethylaniline), 4,4- vinylidenebis(I-aminobenzene), cis- or trans-stilbene or a mixture of two or more thereof.

4. A process as claimed in claim 2, wherein said compound (I) is diphenyl-ethylene, an alkoxydiphenylethylene, dinaphthaleneethylene, 4,4-vinylidenebis(N,N-dimethylaniline), 4,4-vinylidenebis(I-amino-benzene), cis- or trans-stilbene or a mixture of two or more thereof.

5. A process as claimed in claim 1, wherein said monomer (a) is a hydrophilic monomer, a mixture comprising at least two hydrophilic monomers or a mixture comprising at least one hydrophilic and at least one hydrophobic monomer.

6. A process as claimed in claim 2, wherein said monomer (a) is a hydrophilic monomer, a mixture comprising at least two hydrophilic monomers or a mixture comprising at least one hydrophilic and at least one hydrophobic monomer.

7. A process as claimed in claim 3, wherein said monomer (a) is a hydrophilic monomer, a mixture comprising at least two hydrophilic monomers or a mixture comprising at least one hydrophilic and at least one hydrophobic monomer.

8. A process as claimed in claim 4, wherein said monomer (a) is a hydrophilic monomer, a mixture comprising at least two hydrophilic monomers or a mixture comprising at least one hydrophilic and at least one hydrophobic monomer.

9. A process as claimed in claim 1, wherein a low molecular mass base selected from the group consisting of NaOH, KOH, ammonia, diethanolamine, triethanolamine, mono-, di- or triethylamine and dimethylethanolamine or a mixture of two or more of said low molecular mass bases is employed.

10. A process as claimed in claim 2, wherein a low molecular mass base selected from the group consisting of NaOH, KOH, ammonia, diethanolamine, triethanolamine, mono-, di- or triethylamine and dimethylethanolamine or a mixture of two or more of said low molecular mass bases is employed.

11. A process as claimed in claim 3, wherein a low molecular mass base selected from the group consisting of NaOH, KOH, ammonia, diethanolamine, triethanolamine, mono-, di- or triethylamine and dimethylethanolamine or a mixture of two or more of said low molecular mass bases is employed.

12. A process for preparing a polymer (B), which comprises:
    (ii) reacting the reaction product (A) obtained in stage (i) according to claim 1 under free-radical conditions in the presence of at least one free-radically homopolymerizable or copolymerizable monomer (b).

13. A process for preparing a polymer (B), which comprises:

(ii) reacting the reaction product (A) obtained in stage (i) according to claim 2 under free-radical conditions in the presence of a least one free-radical homopolymerizable or copolymerizable monomer b).

14. A reaction product prepared by means of a process comprising the following stage (i):
(i) reacting under free-radical conditions a reaction mixture comprising at least one free-radically reactable monomer (a) in the presence of at least one free-radical initiator and of a compound (I) of the formula:

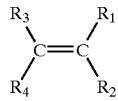

in which $R_1$ to $R_4$ each independently of one another are hydrogen, a substituted or unsubstituted alkyl radical, cycloalkyl radical or aralkyl radical, or an unsubstituted or a substituted aromatic hydrocarbon radical, with the proviso that at least two of $R_1$ to $R_4$ are an unsubstituted or a substituted aromatic hydrocarbon radical in aqueous phase.

15. A polymer B prepared by a process comprising stage (i) as disclosed in claim 1 and stage (ii):
(ii) wherein the reaction product (A) obtained in stage (i) is reacted under free-radical conditions in the presence of at least one free-radically homopolymerizable or copolymerizable monomer (b).

16. An aqueous mixture comprising a reaction product (A) as claimed in claim 14 or a combination of two or more thereof.

17. An aqueous mixture comprising a polymer (B) as claimed in claim 15 or a combination of two or more thereof.

18. A dispersion comprising an aqueous mixture of the reaction product (A) as claimed in claim 14 or a combination of two or more such products.

19. A dispersion comprising an aqueous mixture of the polymer B as claimed in claim 15 or a combination of two or more of such polymers.

* * * * *

UNITED STATES PATENT AND TRADEMARK OFFICE
CERTIFICATE OF CORRECTION

PATENT NO. : 6,506,836 B1
DATED : January 14, 2003
INVENTOR(S) : Bremser et al.

It is certified that error appears in the above-identified patent and that said Letters Patent is hereby corrected as shown below:

<u>Title page,</u>
Item [57], ABSTRACT, line 3 after the formula, "arakyl" should be -- aralkyl --.

<u>Column 12,</u>
Line 8, "In" should be -- in --;
Line 20, "I-aminobenzene" should be -- 1-aminobenzene --.
Line 23, "diphenyl-ethylene" should be -- diphenylethylene --.

Signed and Sealed this

Twenty-fourth Day of June, 2003

JAMES E. ROGAN
*Director of the United States Patent and Trademark Office*